United States Patent
Garbacik et al.

(10) Patent No.: US 10,371,215 B2
(45) Date of Patent: Aug. 6, 2019

(54) TRANSMISSION AND TRANSMISSION CLUTCH SYSTEM

(71) Applicant: FORD GLOBAL TECHNOLOGIES, LLC, Dearborn, MI (US)

(72) Inventors: Carl Garbacik, Northville, MI (US); Marvin Young, Dearborn, MI (US); Mark William Marchie, Highland, MI (US); Jau-Wen Tseng, Ann Arbor, MI (US); Bhupinder Singh, Canton, MI (US); Patrick Duff, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 540 days.

(21) Appl. No.: 15/195,350

(22) Filed: Jun. 28, 2016

(65) Prior Publication Data
US 2017/0370424 A1     Dec. 28, 2017

(51) Int. Cl.
| F16D 13/64 | (2006.01) |
| F16D 13/68 | (2006.01) |
| F16D 13/52 | (2006.01) |
| F16D 13/76 | (2006.01) |
| F16D 25/0638 | (2006.01) |
| F16D 25/10 | (2006.01) |

(52) U.S. Cl.
CPC ........... *F16D 13/648* (2013.01); *F16D 13/52* (2013.01); *F16D 13/68* (2013.01); *F16D 13/76* (2013.01); *F16D 25/0638* (2013.01); *F16D 25/10* (2013.01)

(58) Field of Classification Search
None
See application file for complete search history.

(56) References Cited

U.S. PATENT DOCUMENTS

| 3,841,452 A | * | 10/1974 | Newsock | F16D 13/648 188/218 XL |
| 5,048,654 A | * | 9/1991 | Yesnik | F16D 13/52 188/251 A |
| 5,593,015 A | | 1/1997 | Kosumi et al. | |
| 2004/0074731 A1 | * | 4/2004 | Miyoshi | F16D 13/648 192/70.2 |
| 2011/0139567 A1 | * | 6/2011 | Hauck | F16D 13/648 192/70.11 |
| 2016/0252140 A1 | * | 9/2016 | Mordukhovich | F16D 25/0638 192/66.3 |
| 2016/0258493 A1 | * | 9/2016 | Kobayashi | F16D 13/68 |

FOREIGN PATENT DOCUMENTS

| JP | 2007285382 A | 11/2007 |
| JP | 4818150 B2 | 11/2011 |

* cited by examiner

*Primary Examiner* — Colby M Hansen
(74) *Attorney, Agent, or Firm* — David Kelley; Brooks Kushman P.C.

(57) ABSTRACT

A vehicle transmission includes a first rotating element, second rotating element, first retainer ring, and second retainer ring. The first rotating element has an exterior surface that defines a first ring groove. The second rotating element is configured to limit movement of friction plates during clutch engagement. The second rotating element is disposed about the exterior surface and has an interior surface that defines a second ring groove. The first retainer ring is disposed in the first ring groove. The second retainer ring is disposed in the second ring groove and thereby restricts movement of the first retainer ring in a radially outward direction.

20 Claims, 2 Drawing Sheets

TRANSMISSION AND TRANSMISSION CLUTCH SYSTEM

TECHNICAL FIELD

The present disclosure relates to transmissions and clutch systems utilized in transmissions.

BACKGROUND

Vehicle transmissions, transaxles, or other mechanisms that employ more than one gearing ratio between an input and an output, may transition between various gear ratios by engaging and disengaging various clutches. The clutches may comprise alternating friction plates and separator plates that are configured to selectively couple two rotating elements (shafts, gears, etc.).

SUMMARY

A vehicle transmission includes a first rotating element, second rotating element, first retainer ring, and second retainer ring. The first rotating element has an exterior surface that defines a first ring groove. The second rotating element is configured to limit movement of friction plates during clutch engagement. The second rotating element is disposed about the exterior surface and has an interior surface that defines a second ring groove. The first retainer ring is disposed in the first ring groove. The second retainer ring is disposed in the second ring groove and thereby restricts movement of the first retainer ring in a radially outward direction.

A clutch includes a reaction plate, first retainer ring, and second retainer ring. The reaction plate is disposed about a rotating element that defines a first ring groove. The reaction plate is configured to limit axial movement of friction plates. The reaction plate also defines a second ring groove. The first retainer ring is disposed in the first ring groove. The second retainer ring is disposed in the second ring groove and thereby restricts movement of the first retainer ring in a radially outward direction.

A transmission includes a rotating element, clutch-pack backing plate, exterior retainer ring, and interior retainer ring. The rotating element defines an exterior ring groove. The clutch-pack backing plate defines an interior ring groove. The clutch-pack backing plate is disposed about the rotating element such that the exterior and interior ring grooves are adjacent to each other. The exterior retainer ring is disposed in the exterior ring groove. The interior retainer ring is disposed in the interior ring groove and thereby restricts movement of the exterior retainer ring in a radially outward direction.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
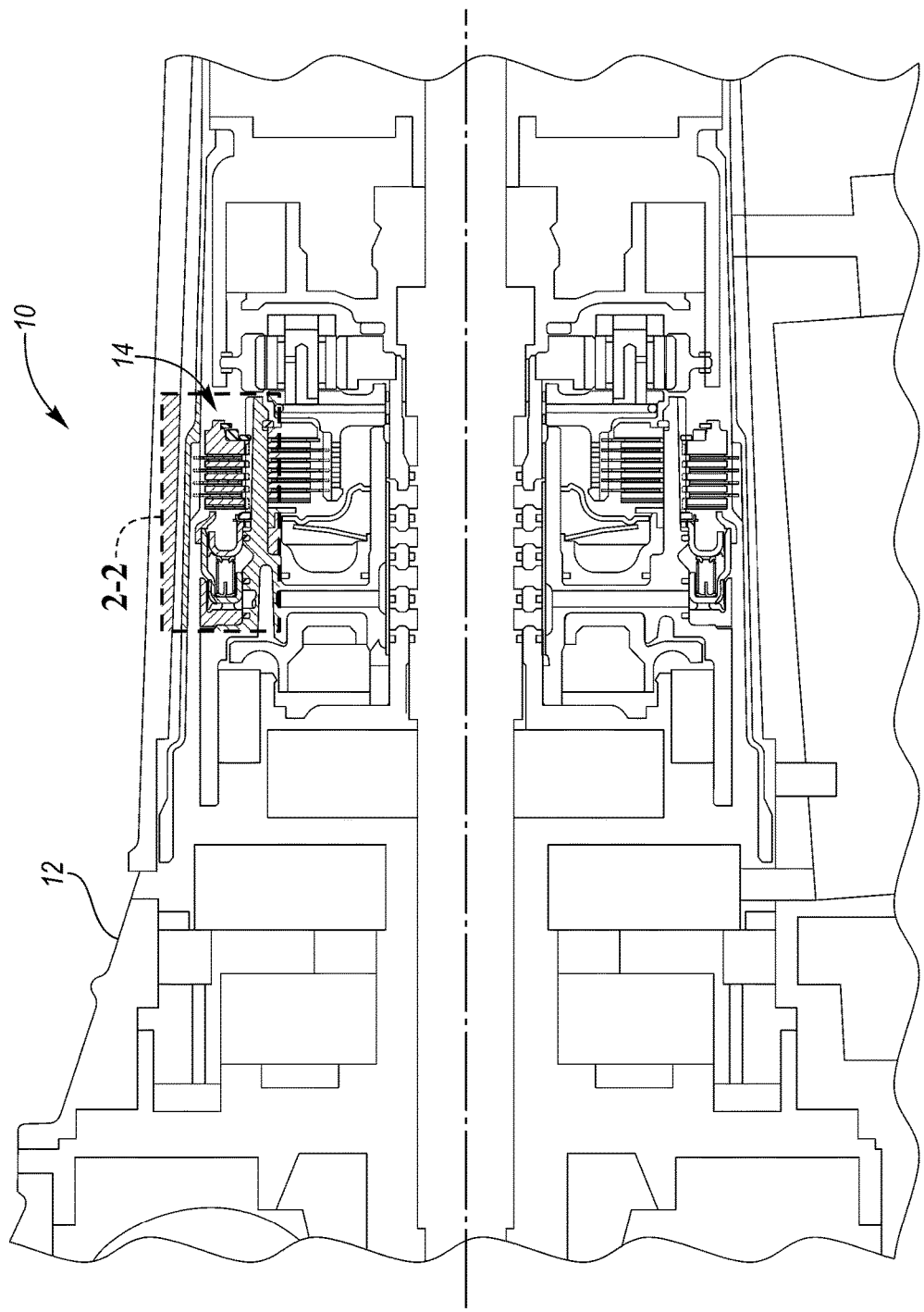
FIG. 1 is a partial cross-section representative of the internal workings of a transmission or transaxle.

Referring to FIG. 1, a partial cross-section representative of the internal workings of a transmission 10 (or transaxle) is illustrated. The transmission 10 includes a transmission case 12 that houses rotating elements such as gears, shafts, etc. A gearing arrangement within the transmission 10 is a collection of these rotating elements (gears, shafts, etc.) and clutches (or brakes) that are configured to impose specified speed relationships among elements. The transmission 10 includes at least one clutch 14 disposed within the transmission case 12. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. The transmission 10 may be a discrete ratio transaxle that has a shiftable gearing arrangement that selectively imposes a variety of speed ratios between an input shaft and an output shaft of the transmission.

A group of elements (gears, shafts, etc.) are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake.

Clutches may be engaged when hydraulic fluid or an actuator (e.g., electrical motor or solenoid) forces a piston into contact with a clutch pack, consisting of alternating friction plates and separator plates. The friction plates may be fixed to a first rotating element while the separator plates are fixed to a second rotating element, or vice versa. Alternatively, the friction plates may be connected to a first rotating element while the separator plates are grounded to a transmission case 12, or vice versa. In this alternative configuration, where either the friction plates or separator plates are grounded to the transmission case 12, a clutch may be referred to as a brake.

Figure 2:
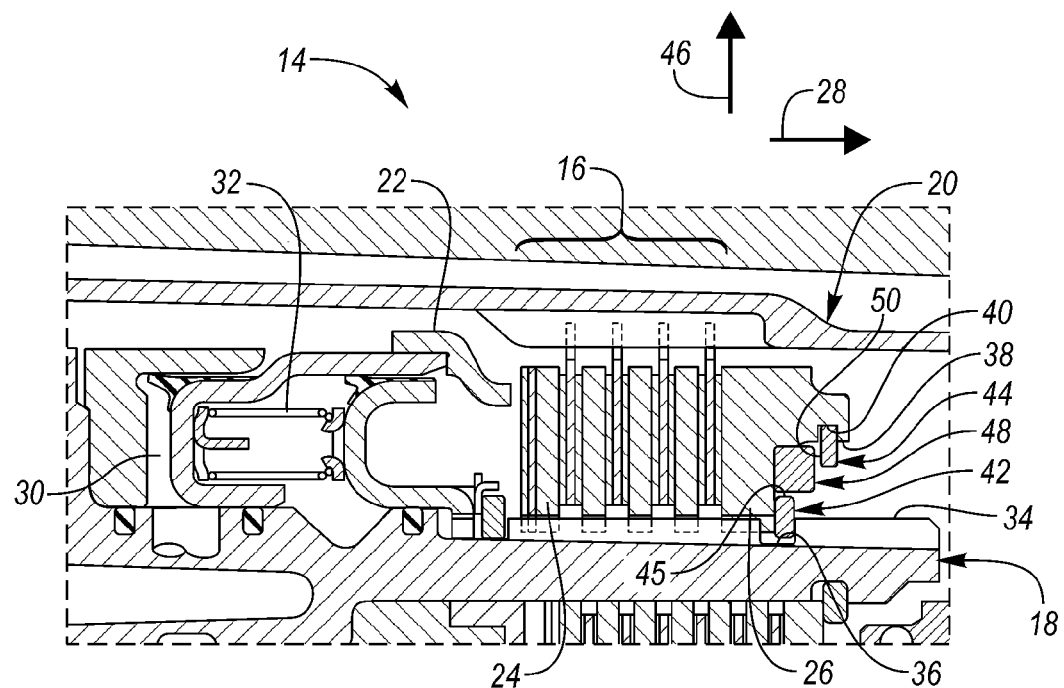
FIG. 2 is an enlarged view of the area encompassed by Area 2-2 shown in FIG. 1 illustrating a clutch.

Referring to FIG. 2, an enlarged view of the area encompassed by Area 2-2 in FIG. 1 further illustrates the clutch 14. The clutch 14 includes a clutch pack 16 that is configured to rotatably couple and decouple a first rotating element 18 and a second rotating element 20. The clutch pack 16 includes plates that are fixedly coupled in an alternating configuration to either the first rotating element 18 or the second rotating element 20. The first rotating element 18 and second rotating element 20 may comprise a rotating shaft or a rotating shell (or drum) that defines a hollow core.

The first rotating element 18 and the second rotating element 20 may be coupled together when a piston 22 engages the clutch pack 16 which forces the adjacent plates of the clutch pack 16 into contact with each other causing the alternating sets of plates to rotate at the same speed (when the clutch is fully engaged) or at proportional speeds (when the clutch is slip engaged). The first plate in the clutch pack 16 that the piston 22 engages may be referred to as the pressure plate 24. A reaction plate (which may also be referred to as a rotating element or a clutch-pack backing plate) 26 may be disposed about an exterior of the first rotating element 18. The reaction plate 26 may act as a stop and limit the movement of the plates of the clutch pack 16 in an axial direction 28. The axial direction 28 may correspond to a direction that an axis of rotation, relative to the moving components in the transmission 10, extends. The amount of force that the piston 22 applies to the clutch pack 16 may be adjusted to either fully engage or slip engage the clutch 14. As the force of the piston 22 increases while the clutch 14 is slip engaged, the proportional speeds between the alternating sets of plates of the clutch 14 will decrease and eventually become synchronized resulting in fully engaging the clutch 14. The piston 22 may be a hydraulic piston that engages the clutch pack 16 when hydraulic fluid is forced into a pressure chamber 30 located at an opposing side of the piston 22 relative to the clutch pack 16. A return spring 32 may be configured to disengage the piston 22 from clutch pack 16. Alternatively, an actuator such as electric motor or an electric solenoid may be used to engage and disengage the piston 22 from the clutch pack 16.

The first rotating element 18 has an exterior surface 34 that defines an exterior (or first) ring groove 36. The reaction plate 26 has an interior surface 38 that defines an interior (or second) ring groove 40. The exterior surface 34 of the first rotating element 18 and the interior surface 38 of the reaction plate 26 are opposing faces or surfaces that face each other once the reaction plate 26 has been disposed about the first rotating element 18. The reaction plate 26 may be disposed about the first rotating element 18 in a position such that the exterior ring groove 36 and the interior ring groove 40 are located within close proximity or adjacent to each other. The exterior ring groove 36 may be offset from the interior ring groove 40 in the axial direction 28 with respect to the first rotating element 18.

A first retainer ring 42 may be disposed within the first ring groove 36. The first retainer ring 42 may act as a stop and limit movement of the reaction plate 26 in the axial direction 28. A second retainer ring 44 may be disposed within the second ring groove 40. The second retainer ring 44 may interact or contact a top or upper surface 45 of the first retainer ring 42 thereby restricting movement of the first retainer ring 42 in a radially outward direction 46. The radially outward direction 46 may correspond to a direction that is perpendicular to the axial direction 28. The first retainer ring 42 may be prone to expanding in the radially outward direction 46 when exposed to high centrifugal forces during rotation of the first rotating element 18. If the first retainer ring 42 were to expand to a point where it slipped out of the exterior ring groove 36, it would no longer be able to limit movement of the reaction plate 26 in the axial direction 28. The portion of the reaction plate 26 defining the interior ring groove 40, on the other hand, will prevent the second retainer ring 44 from expanding outward. Therefore, when the second retainer ring 44 contacts an upper surface 45 of the first retainer ring 42, the first retainer ring 42 will be prevented from expanding outward and therefore will not be able to slip out of the exterior ring groove 36. It should be noted that a small gap may exist between the upper surface of the first retainer ring 42 and the second retainer ring 44 allowing limited radially outward expansion of the first retainer ring 42. The gap should be sized however to prevent the first retainer ring 42 from expanding to a point where it could slip out of the exterior ring groove 36.

Alternatively, as opposed to the second retainer ring 44 directly contacting the upper surface 45 of the first retainer ring 42, the second retainer ring 44 may interact with the first retainer ring 42 through a third (or intermediate) retainer ring 48 that is disposed between the first retainer ring 42 and the second retainer ring 44. For example, the third retainer ring 48 may interact or contact the upper surface 45 of the first retainer ring 42 in order to restrict movement of the first retainer ring 42 in the radially outward direction 46 while also interacting or contacting a side surface 50 of the second retainer ring 44 such that the second retainer ring 44 restricts movement of the third retainer ring 48 in the axial direction 28. The interaction between the second retainer ring 44 and third retainer ring 48 ensures that the third retainer ring 48 remains above the first retainer ring 42 in order to prevent the first retainer ring 42 from expanding in the radially outward direction 46. It should be noted that a small gap may exist between the upper surface of the first retainer ring 42 and the third retainer ring 48 allowing limited radially outward expansion of the first retainer ring 42. The gap should be sized however, to prevent the first retainer ring 42 from expanding to a point where it could slip out of the exterior ring groove 36. It should also be noted that a small gap may exist between the side surface 50 of the second retainer ring 44 and the third retainer ring 48 allowing limited movement of the second retainer ring 44 and/or the third retainer ring 48 in the axial direction 28. The gap should be sized however, so that at least a portion of the third retainer ring 48 remains directly above the upper surface 45 of the first retainer ring 42.

Figure 3:
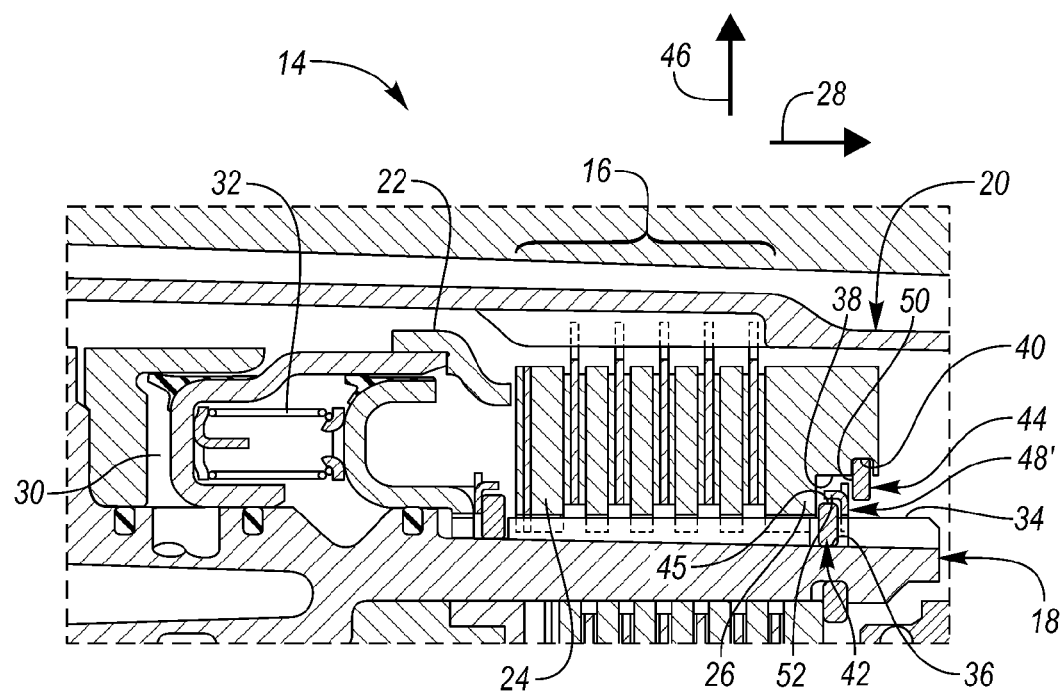
FIG. 3 is an enlarged view of the area encompassed by Area 2-2 shown in FIG. 1 illustrating an alternative configuration of the clutch.

As illustrated in FIG. 2, the third retainer ring 48 has a rectangular cross-section. However, the third retainer ring 48 may have any cross-sectional shape as long as it interacts with the first retainer ring 42 and second retainer ring 44 as described above. For example, FIG. 3 illustrates an alternative embodiment of the third retainer ring. The alternative embodiment of the third retainer ring 48' includes tabs 52 that form L-shaped cross-sections that extend over the upper surface 45 of the first retainer ring 42 in order to restrict movement of the first retainer ring 42 in the radially outward direction 46.

It should be understood, that the clutch 14 and retainer ring configuration described above should not be limited for use only in vehicle transmissions or transaxles, but may be used in any system that requires a clutch or requires retainer rings to prevent axial movement of a rotating part. For example, the clutch 14 may be used in transfer cases, limited-slip differentials, engine disconnect systems (e.g., in hybrid or micro hybrid vehicles), or any other system that requires a clutch, while the retainer ring configuration may be used in vehicles or other machinery (e.g., a lathe) to prevent axial movement of a rotating part that is part of a vehicle component or machine.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle transmission comprising:
   a first rotating element having an exterior surface defining a first ring groove;
   a second rotating element, configured to limit movement of friction plates during clutch engagement, disposed about the exterior surface and having an interior surface defining a second ring groove;
   a first retainer ring disposed in the first ring groove; and
   a second retainer ring disposed in the second ring groove thereby restricting movement of the first retainer ring in a radially outward direction.

2. The transmission of claim 1, further comprising a third retainer ring disposed between the first and second retainer rings, wherein the third retainer ring contacts an upper surface of the first retainer ring restricting movement of the first retainer ring in a radially outward direction and wherein the third retainer ring contacts a side surface of the second retainer ring such that second retainer ring restricts movement of the third retainer ring in an axial direction.

3. The transmission of claim 2, wherein the third retainer ring has an L-shaped cross-section.

4. The transmission of claim 2, wherein the third retainer ring has a rectangular cross-section.

5. The transmission of claim 1, wherein the first ring groove and the second ring groove are defined on opposing faces of the first rotating element and second rotating element, respectively.

6. The transmission of claim 1, wherein the first ring groove is offset from the second ring groove in an axial direction with respect to the first rotating element.

7. The transmission of claim 1, wherein the first rotating element is a shell.

8. The transmission of claim 1, wherein the second rotating element is clutch reaction plate.

9. A clutch comprising:
   a reaction plate disposed about a rotating element defining a first ring groove, wherein the reaction plate is configured to limit axial movement of friction plates and defines a second ring groove;
   a first retainer ring disposed in the first ring groove; and
   a second retainer ring disposed in the second ring groove thereby restricting movement of the first retainer ring in a radially outward direction.

10. The clutch of claim 9, further comprising a third retainer ring disposed between the first and second retainer rings, wherein the third retainer ring contacts an upper surface of the first retainer ring restricting movement of the first retainer ring in a radially outward direction and wherein the third retainer ring contacts a side surface of the second retainer ring such that second retainer ring restricts movement of the third retainer ring in an axial direction.

11. The clutch of claim 10, wherein the third retainer ring has an L-shaped cross-section.

12. The clutch of claim 10, wherein the third retainer ring has a rectangular cross-section.

13. The clutch of claim 9, wherein the first ring groove and the second ring groove are defined on opposing faces of the rotating element and reaction plate, respectively.

14. The clutch of claim 9, wherein the first ring groove is offset from the second ring groove in an axial direction with respect to the rotating element.

15. A transmission comprising:
    a rotating element defining an exterior ring groove;
    a clutch-pack backing plate defining an interior ring groove and disposed about the rotating element such that the exterior and interior ring grooves are adjacent to each other;
    an exterior retainer ring disposed in the exterior ring groove; and
    an interior retainer ring disposed in the interior ring groove thereby restricting movement of the exterior retainer ring in a radially outward direction.

16. The transmission of claim 15, further comprising an intermediate retainer ring disposed between the exterior and interior retainer rings, wherein the intermediate retainer ring contacts an upper surface of the exterior retainer ring restricting movement of the exterior retainer ring in a radially outward direction and wherein the intermediate retainer ring contacts a side surface of the interior retainer ring such that interior retainer ring restricts movement of the intermediate retainer ring in an axial direction.

17. The transmission of claim 16, wherein the intermediate retainer ring has an L-shaped cross-section.

18. The transmission of claim 15, wherein the rotating element is a shell.

19. The transmission of claim 15, wherein the exterior ring groove and the interior ring groove are defined on opposing faces of the rotating element and clutch-pack backing plate, respectively.

20. The transmission of claim 15, wherein the exterior ring groove is offset from the interior ring groove in an axial direction with respect to the rotating element.

* * * * *